United States Patent [19]

Nagano

[11] Patent Number: 4,624,134
[45] Date of Patent: Nov. 25, 1986

[54] HOT-WIRE AIR-FLOW METER
[75] Inventor: Masami Nagano, Katsuta, Japan
[73] Assignee: Hitachi, Ltd., Tokyo, Japan
[21] Appl. No.: 671,412
[22] Filed: Nov. 14, 1984
[30] Foreign Application Priority Data Nov. 16, 1983 [JP] Japan .................................. 58-213939

[51] Int. Cl.⁴ ............................................ G01N 15/00
[52] U.S. Cl. .................................................. 73/118.2
[58] Field of Search ............................ 73/118, 202, 204

[56] References Cited
U.S. PATENT DOCUMENTS 4,478,075 10/1984 Oyama et al. ..................... 73/118 A
4,495,802 1/1985 Kashiwaya et al. ................. 73/204

FOREIGN PATENT DOCUMENTS 0109815 6/1983 Japan ..................... 73/204

Primary Examiner—Stewart J. Levy
Assistant Examiner—Robert R. Raevis
Attorney, Agent, or Firm—Antonelli, Terry & Wands

[57] ABSTRACT

A hot-wire air-flow meter for internal combustion engines is integrated with a throttle valve so that the throttle valve is disposed immediately downstream of the outlet port of a bypass air passage of the air-flow meter. The shaft of the throttle valve inclines at most 45° against a line connecting between the axis of the inlet port of the bypass air passage and the axis of the main air passage of the air-flow meter, whereby disturbance caused by the throttle valve in minimized. Further, a bent duct is disposed upstream of the air-flow meter so that a plane on which a bent axis of the bent duct is disposed crosses the above-mentioned line at an angle of at most 45°, whereby influence of the bent duct on the flow rate measuring accuracy is minimized.

8 Claims, 9 Drawing Figures

HOT-WIRE AIR-FLOW METER

BACKGROUND OF THE INVENTION

The present invention relates to a hot-wire air-flow meter, and particularly to a hot-wire air-flow meter for automobile engines in which a throttle valve for controlling the flow rate of air sucked into the engine is integrated.

An internal combustion engine for automobiles has a fuel supply system comprising a fuel supply line and an air induction line. In the fuel supply system, air purified by an air cleaner is introduced into the engine through a passage. The passage is provided with a fuel supply port, a throttle valve for controlling the flow rate of air flowing into the engine and a hot-wire air-flow meter for measuring the airflow rate. In a conventional internal combustion engine for automobiles, there is a relatively large distance between the throttle valve and the air-flow meter. Namely, the former is arranged near a collector inlet of an intake manifold, and the latter immediately downstream of the air cleaner. When installing them in an automobile which has a cramped engine compartment, it is necessary to integrate the hot-wire air-flow meter and the throttle valve in order to improve mounting easiness and space and reduce the cost of the fuel supply system. FIG. 1 of Japanese Laid-open Patent Application No. 55-104718 shows an integrated flow meter and throttle valve which is mounted on the collector of the intake manifold.

Further, when the space within the engine compartment is limited, an upstream side of the air-flow meter and a downstream side of the air cleaner are communicated by means of a bent duct, as disclosed in Japanese Laid-open Patent Application No. 57-103016. The bent duct, which is bent immediately upstream of the air-flow meter, causes turbulence; therefore in the prior art there is provided a rectifier between the air-flow meter and an air cleaner in order to rectify the turbulence of the air flow.

Turbulence raises the problem that the output voltage of the air-flow meter with respect to the volume of air becomes high with the integrated type of meter, compared with the output voltage of a separate meter in which the air-flow meter is separated from the throttle valve with a relatively large distance, as above-mentioned. Further, the waveform of the output voltage of the integrated meter shows large pulsations compared with the separate meter. Therefore, it is difficult for the hot-wire air-flow meter accompanied by the turbulence to detect the real value of the air flow rate.

SUMMARY OF THE INVENTION

Accordingly an object of the present invention is to provide a hot-wire air-flow meter with a throttle valve integrated therewith, which has an excellent mounting efficiency and provides a high measuring accuracy.

Another object of the present invention is to provide a hot-wire air-flow meter which has a throttle valve integrated therewith, which has good installation and provides a high measuring accuracy, and which solves the above problem caused by the integration of the throttle valve into the hot-wire air-flow meter and the arrangement of a bent duct without providing any rectifiers between the air-flow meter and an air cleaner.

During the development of this invention, it was confirmed experimentally that the real air-flow rate cannot be detected if the hot-wire air-flow meter and the throttle valve are integrated, and, furthermore, it was confirmed that turbulence occurs in the air-flow if, for reasons of space, a bent duct is provided immediately upstream of the air-flow meter resulting in large pulsations in the output voltage of the air-flow meter.

According to the present invention, a means of solving these problems is such that the throttle valve is integrated with the hot-wire air-flow meter so that the central axis of the shaft of the throttle valve will be disposed at an angle of 0°–45° against a line connecting between the central axis of a main air passage of the flow meter and the central axis of a bypass passage provided with a thermosensitive resistor used for measuring the air flow rate.

Preferably, there is provided a means for obviating the adverse effects resulting from the bent duct disposed immediately upstream of the air-flow meter, in addition to the above-mentioned problem solving means. The adverse-effect obviating means is such that the bent duct is mounted so that a plane on which the axis of the bent duct is disposed inclines to the central line of the throttle valve shaft at an angle of at most 45°.

By the integrated hot-wire air-flow meter and throttle valve it is meant that preferably a meter body for defining air passages and mounting various parts is made of one piece on which the throttle valve is mounted, otherwise the hot-wire air-flow meter and the throttle valve are made into one unit in which the flow meter and the throttle valve are disposed so that the distance between the outlet of the bypass passage and the throttle valve shaft is less than 100 mm.

DESCRIPTION OF THE PREFERRED EMBODIMENTS

Figure 1:
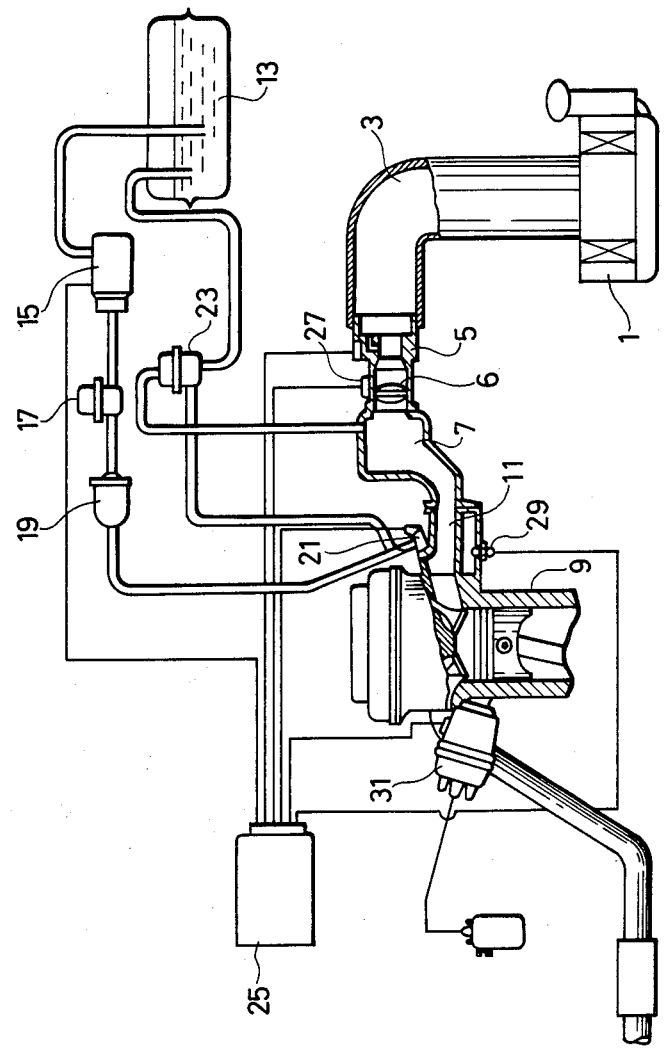
FIG. 1 is a schematic diagram of a fuel supply system in which a hot-wire air-flow meter of an embodiment of the present invention is used.

A preferred embodiment of the invention will be described hereinunder, referring to the drawings. A fuel injection system into which an embodiment of the invention is incorporated will now be described with reference to FIG. 1. Air enters from the intake portion of an air cleaner 1, passes through a duct 3 and past a hot-wire air-flow meter 5, and enters a collector 7. From this section, the air is distributed to each branch of an intake manifold 11, communicating with an internal-combustion engine 9, and is sucked into cylinders. Meanwhile, fuel is sucked from a fuel tank 13 by a fuel pump 15, and the fuel, after being pressurized, is supplied to a fuel line provided with a fuel damper 17, a fuel filter 19, an injector 21, and a fuel-pressure regulator 23. The pressure of the fuel is regulated to a fixed level by the regulator 23, and is injected into the manifold 11 by the injector 21 mounted on the intake manifold 11. A signal detecting the air-flow rate is output from the air-flow meter 5 to a control unit 25. A throttle valve opening sensor 27 is mounted on a throttle valve 6, and a signal for detecting the degree of opening of the throttle valve 6 is output from the sensor 27 to the control unit 25. A temperature sensor 29 is mounted on the internal-combustion engine 9, and a signal for detecting the temperature of the internal-combustion engine 9 is output from the sensor 29 to the control unit 25. A crank angle sensor is built into a distributor 31. Reference signals for injection timing and ignition timing and a signal for detecting the rotational speed are output from this sensor to the unit 25. This completes the description of the fuel injection system.

Figure 3:
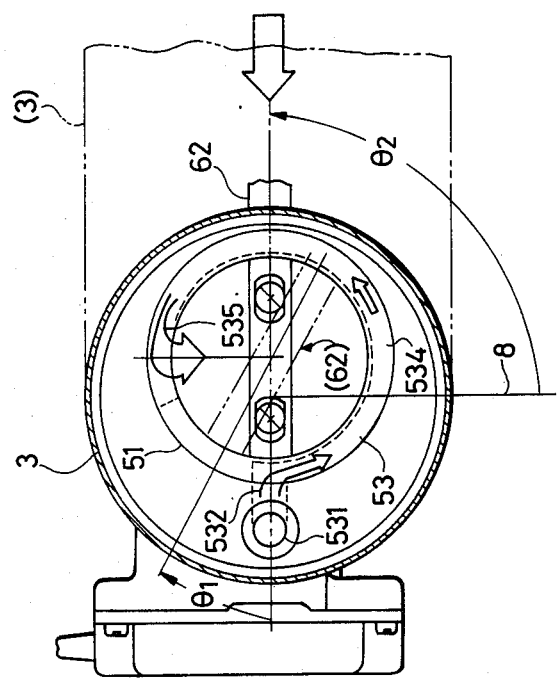
FIG. 3 is a sectional view taken along a line III—III of FIG. 2.

Next, the hot-wire air-flow meter 5 will be described hereinunder in detail, referring to FIGS. 2 and 3.

Figure 2:
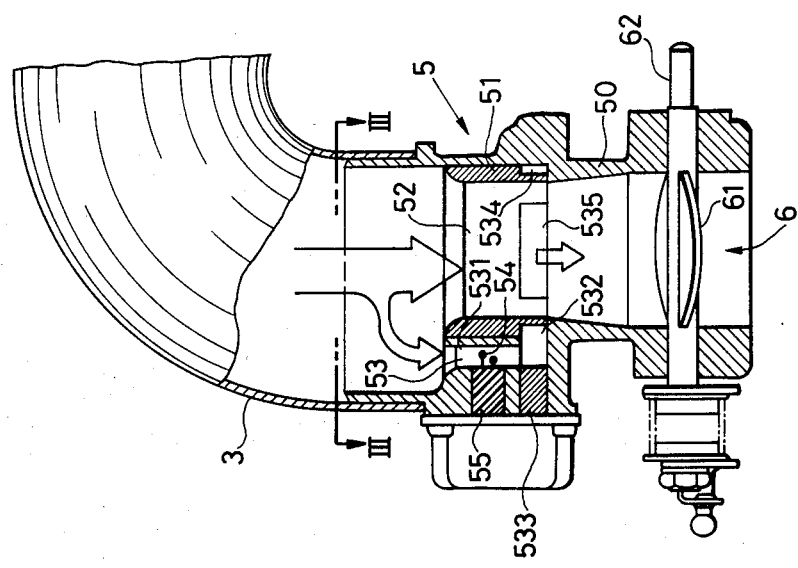
FIG. 2 is a sectional front view of the hot-wire air-flow meter in FIG. 1.

In FIG. 2, a flow meter body 50 or member is made of one piece for defining main and bypass air passages 52 and 53 and for mounting various parts. A ring 51 is rigidly inserted in a bore of the flow meter body 50 to form a venturi portion of the main air passage 52. The bypass air passage 53 is made by vertical and horizontal bores 531 and 532 formed in the flow meter body 50 and a channel which is described later. The central axis of the vertical bore 531 is parallel to the central axis of the main air passage 52 at the venturi portion, that is, to the central axis of the ring 51. Thermosensitive resistors 54 or hot wires held by a plastic mold 55 are disposed in the vertical bore 531 of the bypass air passage 53 in order to measure air flow rate in the bypass air passage 53. The vertical bore 531 communicates with the horizontal bore 532, with one end of the bore 532 being blocked by an insert 533. The ring 51 has a recess on the outer surface at one end thereby forming the above-mentioned channel 534 in cooperation with the inner wall of the bore of the flow meter body 50. The channel 534 communicates with the horizontal bore 532 and an outlet port 535 which is formed rectangular at a position of 270° from the vertical bore 531 as shown in FIG. 3. The angular central position of the outlet port 535 is preferably about 230°-310° from the inlet port 531, whereby the bypass passage becomes long and the pulsation of air flow in the bypass passage 53 is partially absorbed. The vertical bore 531 or inlet port of the bypass air passage 53 is opened to the upstream side of the venturi portion so as to be subjected to total pressure of the air-flow from the duct 3, and the outlet port 535 is subjected to only static pressure.

The throttle valve 6, which is disposed immediately downstream of the outlet port 535, comprises a valve body 61 and a throttle valve shaft 62 securing thereon the valve body 61 and being turnably supported by the flow meter body 50. The throttle valve 6 is positioned so that the central axis of the throttle valve shaft 62 is disposed on a line connecting the central axis of the vertical bore 531 and the central axis of the venturi portion of the main air passage, that is, the ring 51.

By the construction, influence on the air flow rate in the bypass air passage 53 by the integration of the throttle valve 6 into the air-flow meter 5 is minimized.

Figure 4:
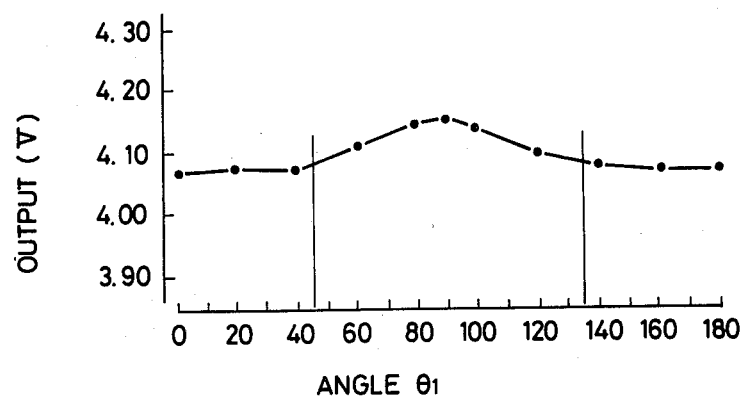
FIG. 4 is a graph showing a relation between inclination angles $\theta 1$, and air-flow meter output voltage.
Figure 5:
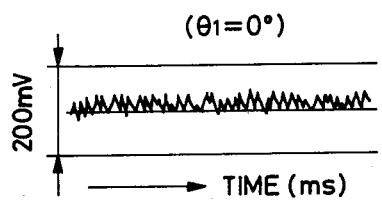
FIG. 5 and 6 are waveform diagrams of the output voltage of the air-flow meter.
Figure 6:
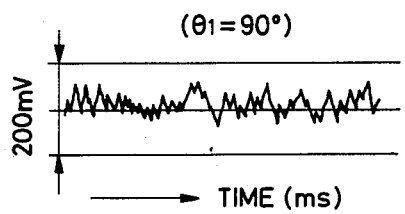

A description will be made of experiments with respect to a relative angular position between the inlet port 531 and the throttle valve shaft 62. The experiments were carried out using the same hot-wire air-flow meter as the above-mentioned except that the angular position of the throttle valve shaft 62 relative to the inlet port 531 of the bypass air passage 53 can be set freely, under the condition that air flows into the main air passage 52 uniformly. Measurements were made of output voltage, and observed, when the air-flow rate was set to 200 Kg/h and the relative angular position or angle $\theta_1$, as shown in FIG. 3, of the throttle valve shaft 62 with respect to the inlet port 53 of the by-pass air passage 52 was varied. The results are shown in FIG. 4 to 6. FIG. 4 shows the relationship between output voltage with respect to the relative angular position $\theta_1$. The real air-flow rate was detected when the air inlet port 531 of the bypass passage 53 was located on the axial center line of the throttle valve 6. However, if the relative angular position $\theta_1$ was varied, an error began to emerge in the vicinity of 45° and became a maximum at 90°. If the relative angular position $\theta_1$ was varied further, the error became gradually smaller, and the real air-flow rate was measured again from around 135°. FIGS. 5 and 6 show the results of observations of the waveform of the output voltage when the relative angular position $\theta_1$ is 0° (180°) and 90°, respectively. These FIGS. 5 and 6 show that pulsations were large at 90° where the output voltage was high and the error was large. Accordingly, the permissible range of $\theta_1$ is 0°-45° and 135°-180°, that is to say, the inclination angle of the throttle valve shaft 62 to the line connecting the central axis of the inlet port 531 and the central axis of the ring 51 is at most 45°.

The outlet port 535 of the bypass air passage 53 is disposed in a perpendicular direction to the throttle valve shaft 62. The throttle valve opening at the position is larger than the other position and influence of the pressure in the air flow by the throttle valve 6 is small compared with the other position.

Figure 7:
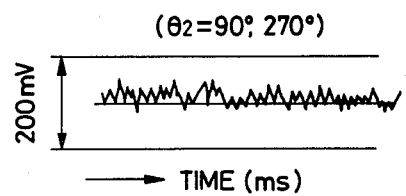
FIG. 7 to 9 are waveform diagrams of air-flow meter output voltage.
Figure 8:
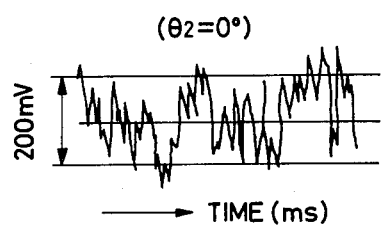
Figure 9:
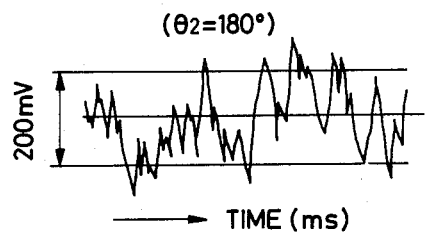

Next, on the basis of the results of these experiments, a study was made of the relationship between air-flow direction and the output voltage in which the air inlet port 531 of the bypass passage 53 was positioned on the axial center line of the throttle valve shaft 62. The experiments were conducted at an air-flow rate of 200 Kg/h, using such apparatus that the bent duct 3 is mounted on the hot-wire air-flow meter 5 so that its position can be freely varied with respect to the hot-wire air-flow meter 5. In the experiments the axial centers of the inlet port 531 of the bypass passage 53 and the throttle valve shaft 62 were aligned and only the angular position of the bent duct 3 was varied. The relative angular position $\theta_2$ of the duct 3 is measured using, as a reference ($\theta_2=0$), a line 8 perpendicular to the line connecting the central axis of the inlet port 531 and the central axis of the ring 51. The output voltage was measured, and the waveform of the output voltage was observed. The results of the experiments are shown in FIGS. 7 to 9. The output voltage was high and the error largest when a plane on which the axis of the bent duct 3 is disposed was aligned to the reference line 8, namely, the throttle valve shaft 62 was perpendicular to the air flow. When the relative angular position of the duct 3 was gradually varied, the output voltage dropped gradually, and measurement of the real air-flow rate was obtained at 90° and 270°. If experimental error is taken into consideration, the permissible range of $\theta_2$ is 45°-135° or 230°-315°. The waveforms of the output voltage during this time are shown in FIGS. 7 to 9. The pulsations were minimal when $\theta_2$ was 90° (FIGS. 7), detecting the real air-flow rate, while large pulsations occurred when $\theta_2$ was 0° and 180° (FIGS. 8 and 9).

As described above, the present invention has the effect that an inexpensive and compact hot-wire air-flow meter, integrated with a throttle valve, and having an excellent mounting efficiency can be mounted on an internal-combustion engine to provide an accuracy equivalent to that of a conventional separate meter, even if a bent duct is provided upstream of the air-flow meter.

What is claimed is:

1. A hot-wire air-flow meter for measuring the flow rate of air flowing from an air cleaner into an internal combustion engine, comprising:
   means for defining main air passage having a venturi portion, said main air passage means including a flow meter body made of one piece and a ring rigidly inserted in said flow meter body for forming said venturi portion;
   a bypass air passage defined by said main air passage defining means so as to bypass said main air passage, said bypass air passage having an inlet port upstream of said venturi portion and an outlet port downstream of said venturi portion, said inlet port being a bore made in said flow meter body so as to open to said main air passage and said outlet port being opened to said main air passage and positioned so that the center of said outlet port is disposed at a position angularly distant 230°–310° from said inlet port;
   thermosensitive means disposed in said bypass air passage for electrically detecting the flow rate of air flowing therein; and
   a throttle valve turnably mounted on said main air passage defining means immediately downstream of said outlet port of said bypass passage by a valve shaft of said throttle valve so that a relative angular position of said valve shaft to a line connecting the central axis of said inlet port of said bypass air passage and the central axis of said main air passage is at most 45.

2. The hot-wire air-flow meter as defined in claim 1, wherein said outlet port of said bypass air passage is disposed in a perpendicular direction to said throttle valve shaft.

3. The hot-wire air-flow meter for measuring the flow rate of air flowing from an air cleaner into an internal combustion engine, comprising:
   a flow meter body made of one piece defining therein a main air passage;
   a ring rigidly inserted in said flow meter body and forming a venturi position;
   a bypass air passage defined by said flow meter body so as to bypass said main air passage, said bypass air passage having an inlet port upstream of said venturi portion and an outlet port downstream of said venturi portion, said inlet port being a bore made in said flow meter body so that the central axis of said bore is in parallel to the central axis of said ring;
   thermosensitive means disposed in said bypass air passage for electrically detecting the flow rate of air flowing therein;
   a throttle valve turnably mounted on said flow meter body immediately downstream of said outlet port of said bypass passage by a valve shaft of said throttle valve so that a relative angular position of said valve shaft to a line connecting between the central axis of said inlet port of said bypass air passage and the central axis of said main air passage is at most 45°; and
   a bent duct for fluidly connecting said flow meter body to said air cleaner, said bent duct being mounted on said flow meter body so that the central axis of said throttle valve shaft crosses, at an angle of at most 45°, a plane on which the axis of said bent duct is disposed.

4. The hot-wire air-flow meter as defined in claim 3, wherein said outlet port of said bypass air passage is opened to said main air passage and positioned so that the center of said outlet port is disposed at a position angularly distant 230°–310° from the said inlet port.

5. The hot-wire air-flow meter as defined in claim 4, wherein said outlet port of said bypass air passage is disposed in a perpendicular direction to said throttle valve shaft.

6. The hot-wire air-flow meter as defined in claim 3, wherein said bypass passage inlet port is round and subjected to total pressure in the air passage, upstream of said venturi portion, said bypass air passage outlet port being rectangular and subjected to a static pressure in the air passage.

7. The hot-wire air-flow meter as defined in claim 6, wherein the axis of said throttle valve shaft crosses, at right angle, a plane which includes therein central the axis of said ring and passes the centers of said ring and said bypass passage outlet port.

8. The hot-wire air-flow meter as defined in claim 3, wherein said bent duct is bent about a right angle.

* * * * *